United States Patent
Keesara et al.

(10) Patent No.: US 9,755,845 B2
(45) Date of Patent: Sep. 5, 2017

(54) PROTOCOL INDEPENDENT MULTICAST (PIM) SNOOPING FOR A SHORTEST PATH BRIDGING MULTICAST (SPBM) NETWORK

(71) Applicant: Avaya Inc., Basking Ridge, NJ (US)

(72) Inventors: Srikanth Keesara, Tewksbury, MA (US); David Johnson, Jr., North Andover, MA (US); Julie Alma Carleton, North Andover, MA (US)

(*) Notice: Subject to any disclaimer, the term of this patent is extended or adjusted under 35 U.S.C. 154(b) by 97 days.

(21) Appl. No.: 14/550,237

(22) Filed: Nov. 21, 2014

(65) Prior Publication Data
US 2016/0149715 A1    May 26, 2016

(51) Int. Cl.
*H04L 12/18*    (2006.01)
*H04L 12/721*    (2013.01)
*H04L 12/761*    (2013.01)

(52) U.S. Cl.
CPC ............... *H04L 12/18* (2013.01); *H04L 45/12* (2013.01); *H04L 45/16* (2013.01)

(58) Field of Classification Search
CPC .......... H04L 12/18; H04L 45/12; H04L 45/16
USPC ........................................................ 370/390
See application file for complete search history.

(56) References Cited

U.S. PATENT DOCUMENTS

| 2010/0165988 | A1* | 7/2010 | Soccol | H04L 12/1886 |
| | | | | 370/390 |
| 2013/0077624 | A1* | 3/2013 | Keesara | H04L 12/4633 |
| | | | | 370/390 |
| 2013/0077627 | A1* | 3/2013 | Appalla | H04L 12/1836 |
| | | | | 370/390 |
| 2013/0089093 | A1* | 4/2013 | Bacthu | H04L 12/4633 |
| | | | | 370/390 |

OTHER PUBLICATIONS

"Brocade ICX 6650 IP Multicast Configuration Guide"; http://www1.brocade.com/downloads/documents/html_product_manuals/FI_ICX6650_07500_IMCG/wwhelp/wwhimpl/common/html/wwhelp.htm#href=FL_IGMP_FGS.4.3.html&single=true.
"Configuring PIM Snooping"; Cisco IOS Software Configuration Guide, Release 12.2SX; Chapter 41; http://www.cisco.com/c/en/us/td/docs/switches/lan/catalyst6500/ios/12-2SX/configuration/guide/book/snooppim.pdf.
"PIM Snooping for VPLS"; Technical Documentation—Support—Juniper Networks; Aug. 28, 2013; http://www.juniper.net/techpubs/en_US/junos13.2/topics/topic-map/pim-snooping-vpls.html.

* cited by examiner

*Primary Examiner* — Omar Ghowrwal
*Assistant Examiner* — Kokou R Detse
(74) *Attorney, Agent, or Firm* — Ropes & Gray LLP

(57) ABSTRACT

A method and apparatus for providing Protocol-Independent Multicast (PIM) snooping for a Shortest Path Bridging Multicast (SPBM) Network is presented. An ingress Backbone Edge Bridge (BEB) device of a Shortest Path Bridging (SPB) network having at least one egress BEB coupled to at least one PIM network performs the following operations. The egress BEB, snoops join and prune messages for a multicast stream in the SPB network. A multicast tree is built in the SPB network for the multicast stream in accordance with the join and prune messages. The multicast stream is forwarded through the SPB network in accordance with the multicast tree.

20 Claims, 7 Drawing Sheets

PROTOCOL INDEPENDENT MULTICAST (PIM) SNOOPING FOR A SHORTEST PATH BRIDGING MULTICAST (SPBM) NETWORK

BACKGROUND

The present disclosure relates to network computing. Computer networks typically include a collection of computing devices enabled to communicate with each other for handling data traffic and control instructions. For example, such devices can include servers, data centers, routers, network switches, management applications, wireless access points, and client computers. Computer networks can provide network connectivity to wired computing devices and/or wireless computing devices.

One type of network technology is known as Shortest Path Bridging (SPB). A set of standards for implementing Shortest Path Bridging is generally specified by the Institute of Electrical and Electronics Engineers (IEEE). Specifically, this standard is identified as IEEE 802.1aq. Network services, including SPB services are commonly provided using Ethernet technology. Ethernet has become a default Data Link Layer technology for data transport, that is, the default for Layer 2 (L2) of the Open Systems Interconnection (OSI) model. SPB can expand Ethernet technologies to other or larger networks. For example, a network that uses IEEE 802.1aq SPB can advertise both topology and logical network membership. SPB uses a link state protocol for such advertising.

In an SPB network, packets are encapsulated at an edge node either in Mac-in-Mac 802.1ah frames and transported only to other members of the logical network. IEEE 802.1aq supports unicast and multicast, and all routing is on symmetric shortest paths. There exist other related technologies that follow the model of a provider network (transport network) that connects two or more customer networks (access networks), where the provider network is functionally distinct from the customer network, even if a single administrator runs both networks.

The SPB network typically includes a Backbone Edge Bridge (BEB) and a Backbone Core Bridge (BCB). BEBs (also known as provider network edge nodes) function as devices that enable transfer of packets to/from interfaces within the SPB network and to/from interfaces outside the SPB network.

A network protocol related to SPB is known as Intermediate System To Intermediate System (IS-IS). IS-IS is a routing protocol that routes data by determining a best route for datagrams transmitted through a packet-switched network. The IS-IS protocol is published by Internet Engineering Task Force (IETF) as an Internet Standard in RFC 1142, as well as in International Organization for Standardization (ISO)/International Electrotechnical Commission (IEC) 10589:2002. SPB Networks can use IS-IS as a control protocol and type-length-value (TLV) structures for control messaging. A TLV structure allows optional information to be encoded within a given packet.

Multicasting is a point-to-multipoint model for delivery of information from one source to a group of destination computers. There are various protocols for implementing multicasting in Internet Protocol (IP) networks. For example, one technology is Protocol-Independent Multicast (PIM). PIM includes a few different protocols that can create different distribution trees for sending data packets to interested receivers (or groups of interested receivers) in a single transmission. Snooping refers to monitoring network traffic looking for particular types or numbers of packets.

SUMMARY

A SPB Network can be used to provide a layer-2 transport service connecting PIM routers that are external to the SPB Network. The SPB network floods the PIM control traffic and IP Multicast data traffic received at any access-point of the L2 service to all other access-points of the service. This allows the PIM routers to establish adjacencies and allow traditional PIM control plane signaling to occur. The net result is that traffic for IP Multicast streams is exchanged between the routers over the L2 service. In this model the SPB network does not attempt to prune or otherwise limit the flow of IP Multicast data traffic based whether or not a particular PIM router connected across an access-point has requested a particular stream of traffic. This can lead to inefficient use of bandwidth both in the core of the SPB Network and also on the access interfaces connecting to the PIM Routers.

The presently disclosed method and apparatus provides pruning of multicast traffic over a L2VSN on a SPB Network by snooping on PIM control protocol messages. Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

In a particular embodiment of a method for providing PIM snooping for a SPB network, the method includes snooping, by an egress BEB, join and prune messages for a multicast stream in the SPB network. The method further includes building a multicast tree in the SPB network for the multicast stream in accordance with the join and prune messages. The method also includes forwarding the multicast steam through the SPB network in accordance with the multicast tree.

Other embodiments include a computer readable medium having computer readable code thereon for providing PIM snooping for a SPB network. The computer readable medium includes instructions for snooping, by an egress BEB, join and prune messages for a multicast stream in the SPB network. The computer readable medium further includes instructions for building a multicast tree in the SPB network for the multicast stream in accordance with the join and prune messages. The computer readable medium also includes instructions for forwarding the multicast steam through the SPB network in accordance with the multicast tree.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides PIM snooping for a SPB network as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing PIM snooping for a SPB network as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Basking Ridge, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention. The drawings are not necessarily to scale, emphasis instead being placed upon illustrating the principles of the invention.

DETAILED DESCRIPTION

Figure 1:
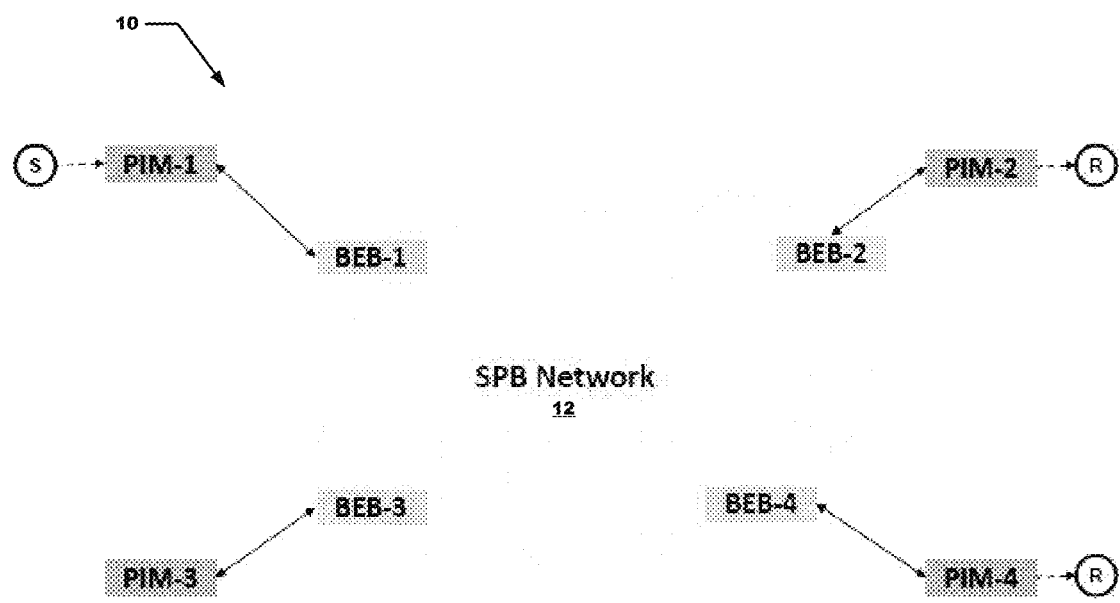
FIG. 1 depicts a block diagram of a network environment used for providing PIM snooping in accordance with a particular embodiment of the present invention.
Figure 2:
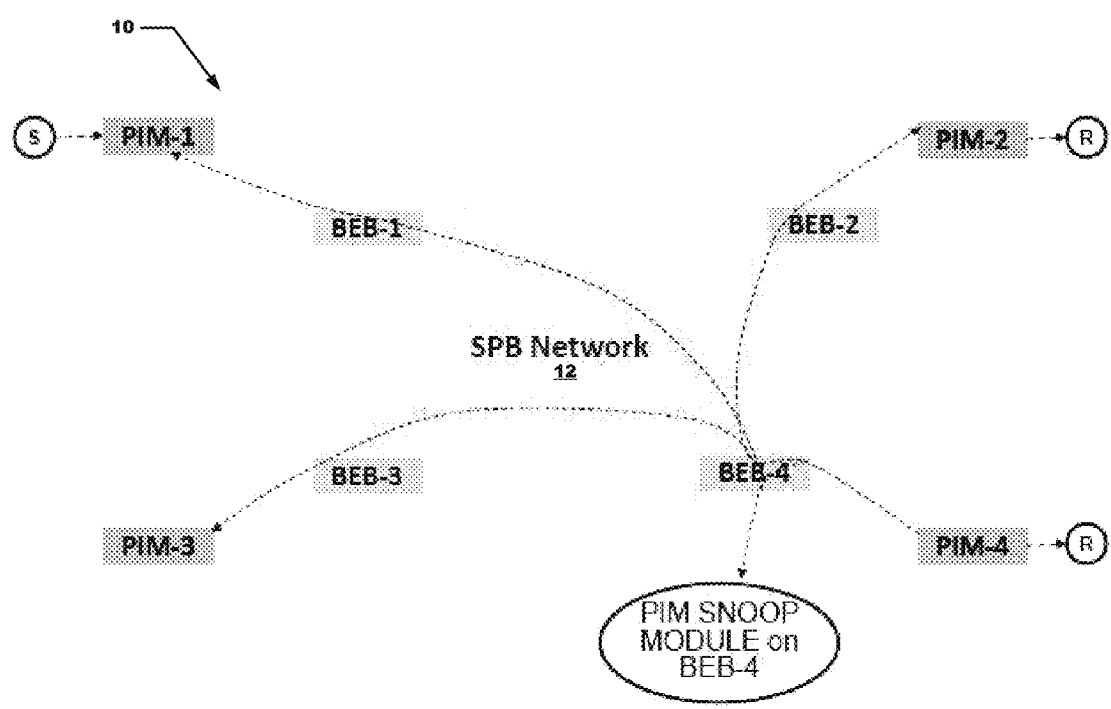
FIG. 2 depicts a block diagram of a network environment used for providing PIM snooping of join and prune commands in accordance with a particular embodiment of the present invention.
Figure 3:
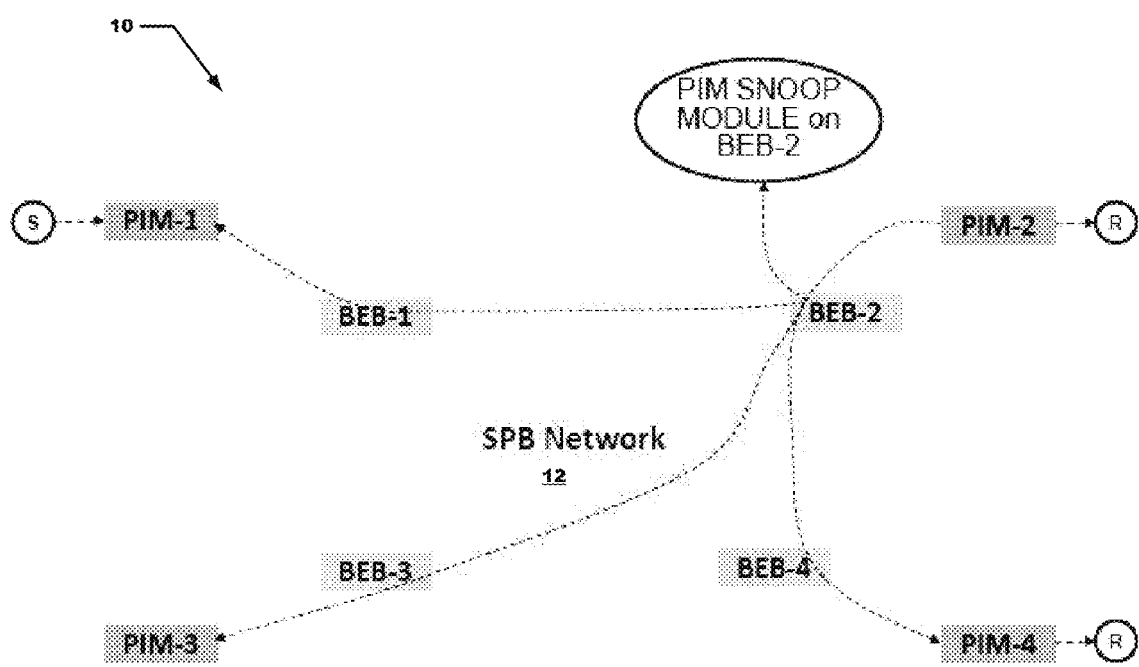
FIG. 3 depicts a block diagram of a second network environment used for providing PIM snooping of join and prune commands in accordance with a particular embodiment of the present invention.
Figure 4:
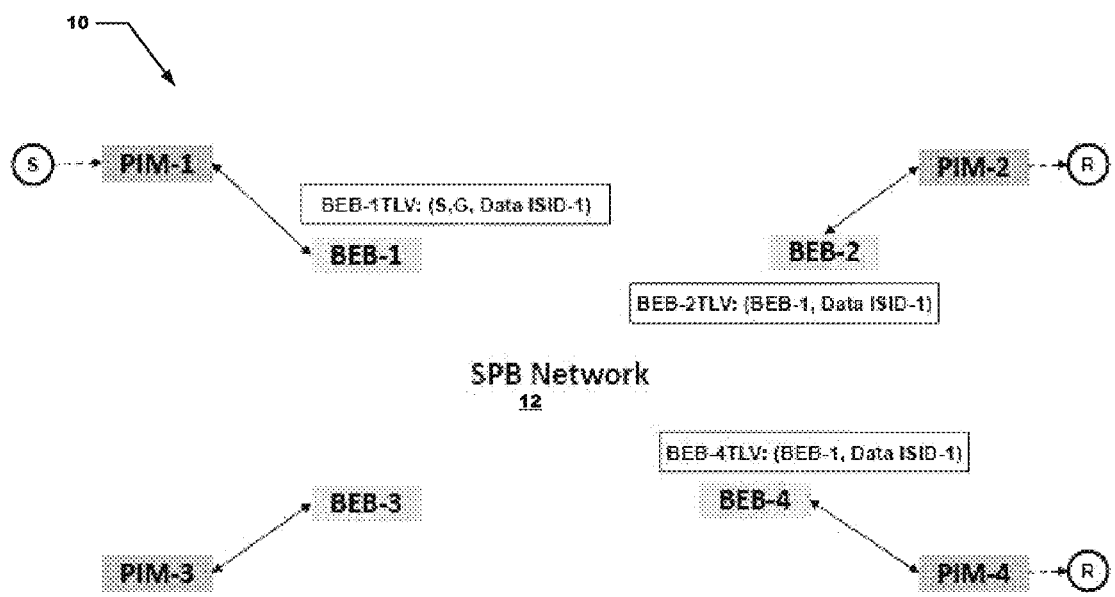
FIG. 4 depicts a block diagram of a network environment showing ISIS TLVs in accordance with a particular embodiment of the present invention.
Figure 5:
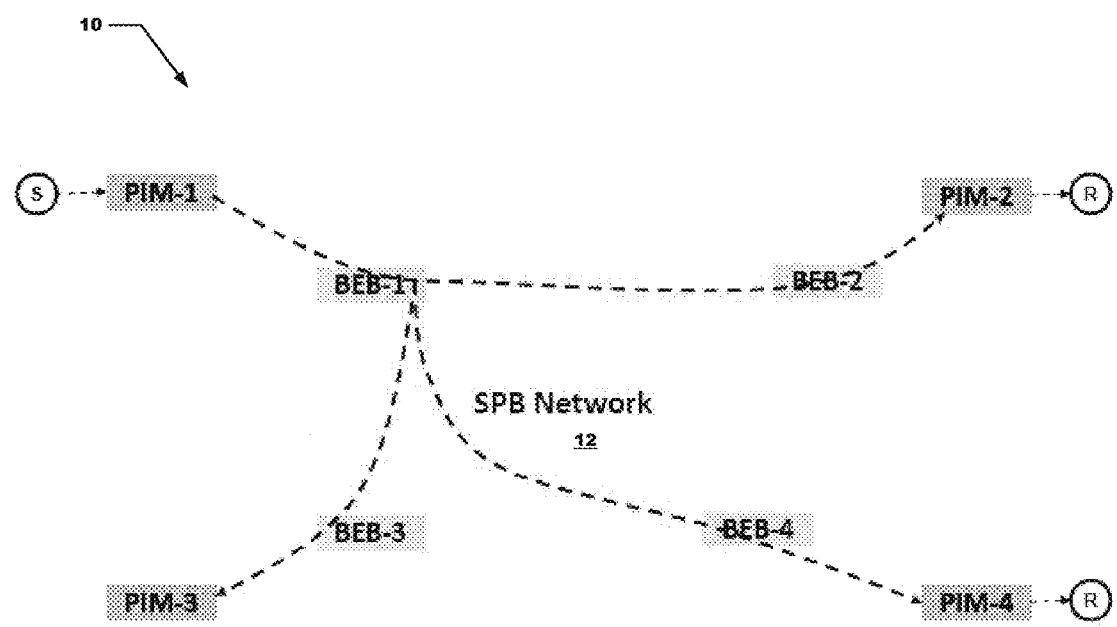
FIG. 5 depicts a block diagram of a network environment used for snooping traffic commands in accordance with a particular embodiment of the present invention.

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

The preferred embodiment of the invention will now be described with reference to the accompanying drawings. The invention may, however, be embodied in many different forms and should not be construed as limited to the embodiment set forth herein; rather, this embodiment is provided so that this disclosure will be thorough and complete, and will fully convey the scope of the invention to those skilled in the art. The terminology used in the detailed description of the particular embodiment illustrated in the accompanying drawings is not intended to be limiting of the invention. In the drawings, like numbers refer to like elements.

Referring now to FIGS. 1-6, various network environments are shown. In FIG. 1, a first network environment 10 is shown. Network environment 10 includes an SPB network 12 having four BEB devices (BEB-1 through BEB-4), each respective BEB device communicating with a respective PIM network device (PIM-1 through PIM-4). A Network operator enables PIM snooping on the set of BEBs where a L2 service (L2VSN) is configured. When this option is not exercised by the user, PIM control and IP Multicast data traffic is treated as flooded L2 traffic. Otherwise the following description applies.

PIM Join and Prune messages received at an access-point (UNI) are copied to a "PIM-Snooping" module (shown in FIG. 2 and FIG. 3) on the local CPU of the BEB in addition to being flooded on the L2VSN. Other kinds of PIM control traffic and PIM control traffic received over the NNI do not need to be copied to the local CPU of the BEB.

The PIM-Snooping module maintains a list of active receiver ports for each stream based on the Join/Prune messages that it receives. It processes both (S, G) and (*, G) messages for this purpose. An Ingress BEB that receives IP Multicast traffic on a UNI of an L2VSN enabled for PIM snooping dynamically allocates an I-SID for this stream and advertises the corresponding (S, G, Service Instance) via Dynamic I-SID mapping to the rest of the SPB Network using existing ISIS TLVs.

A BEB that has active receiver ports for a stream joins all Data I-SID trees representing the stream by sending the ISIS TLVs used to join an I-SID in the SPB Network. This allows the SPB network to build the trees required for the multicast traffic for a stream to flow from the ingress BEB to the set of Egress BEBs that have active receiver ports for the stream. Egress BEBs further replicate the traffic and send it over all the active receiver ports for the stream.

An Ingress BEB as port of stream maintenance, checks for activity on the stream and if a stream has been inactive for a duration longer than the allowed aging time withdraws the advertisement for the Data I-SID that it allocated for the stream. The PIM-snooping module runs the necessary timers etc. needed to refresh/age-out receiver ports for a stream. When an update of active receiver ports on an Egress BEBs results in the last active receiver port to be removed, the Egress BEBs withdraws its RX interest in the Data I-SID for that tree resulting in the pruning of the tree within the SPB Network.

By way of the presently described L2VSN PIM snooping, independent PIM domains or islands of the same PIM domain connect to one another across an SPB Network via a L2VSN. There is no need for L3 configuration in the SPB Network on the L2VSN as PIM Snooping is only enabled on the L2VSN. The BEBs on the L2VSN allow the PIM control packets to be flooded and cross between the PIM Networks. The BEBs also snoop on the PIM Control messages.

The BEBs never originate any PIM Control messages of their own. When a Stream shows up on a UNI—the BEB learns and advertises the stream. The BEBs act on PIM Join and PIM Prune messages to build, prune, and maintain the multicast tree in the SPB Network. Traffic is only sent out of those UNIs where a PIM Join is in effect. Both (*, G) and (S, G) are supported. The traffic is constrained to the L2VSN and is not routed by the SPB Network to other L2VSNs.

Figure 6:
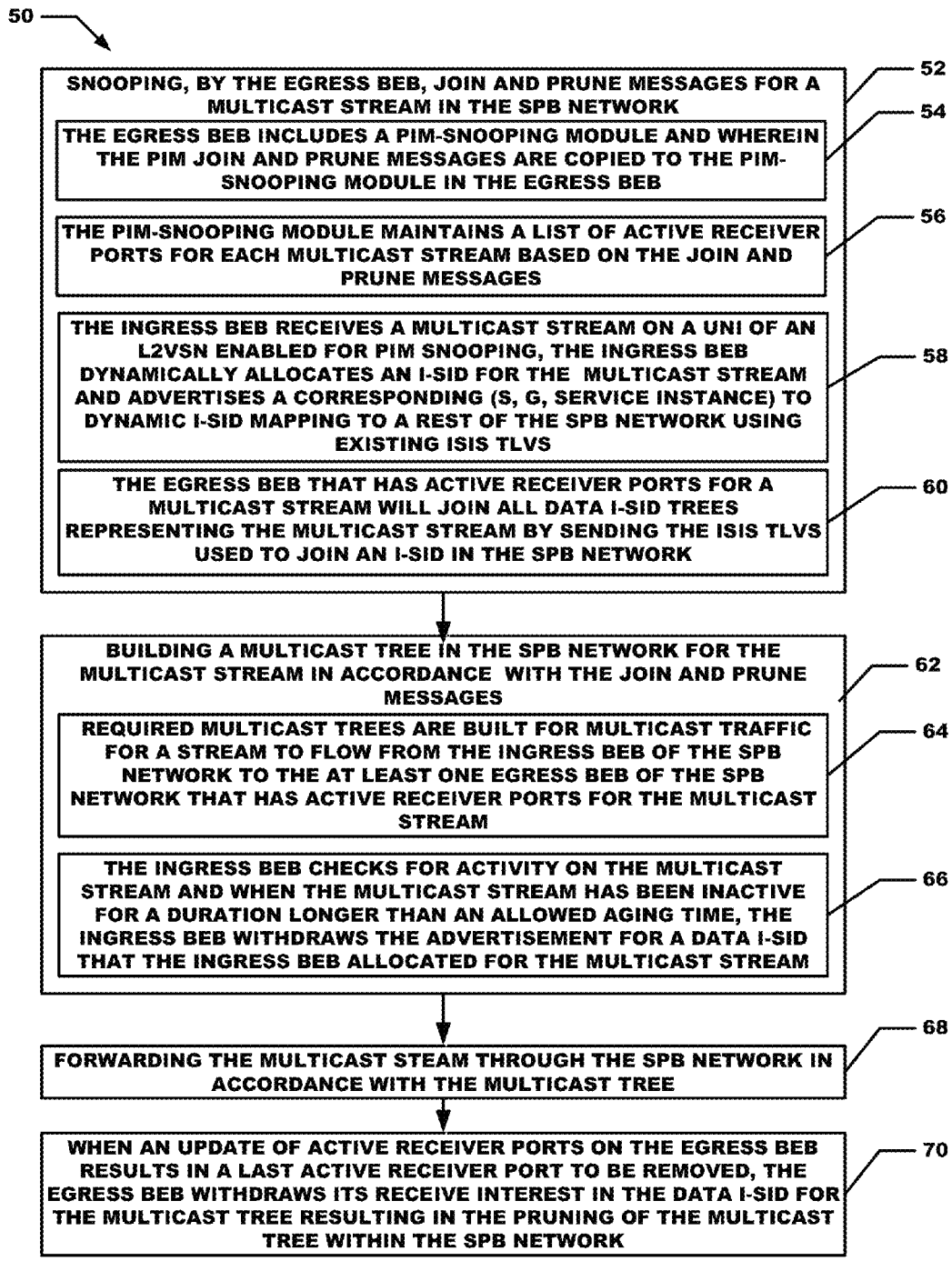
FIG. 6 depicts a flow diagram of a particular embodiment of a method for Protocol-Independent Multicast (PIM) snooping for a Shortest Path Bridging Multicast (SPBM) network in accordance with a particular embodiment of the present invention.

A flow chart of the presently disclosed method is depicted in FIG. 6. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 6, a particular embodiment of a method 50 for PIM snooping is shown. Method 50 begins with processing block 52 which discloses snooping, by the egress BEB, join and prune messages for a multicast stream in the SPB network. As shown in processing block 54 the egress BEB includes a PIM-Snooping module and wherein the PIM join and prune messages are copied to the PIM-Snooping module in the egress BEB. As further shown in processing block 56 the PIM-Snooping module maintains a list of active receiver ports for each multicast stream based on the join and prune messages. Processing block 58 discloses that the ingress BEB receives IP Multicast traffic on a UNI of an L2VSN enabled for PIM snooping and dynamically allocates an I-SID for the multicast stream and advertises the corresponding (S, G, Service Instance) via Dynamic I-SID mapping to a rest of the SPB Network using existing ISIS TLVs. Processing block 60 states the egress BEB that has active receiver ports for a multicast stream will join all Data I-SID trees representing the multicast stream by sending the ISIS TLVs used to join an I-SID in the SPB network.

Processing block 62 recites building a multicast tree in the SPB network for the multicast stream in accordance with the join and prune messages. As shown in processing block 64 the required multicast trees are built for multicast traffic for a stream to flow from the ingress BEB of the SPB network to the at least one Egress BEB of the SPB network that has active receiver ports for the multicast stream. As further shown in processing block 66 when the ingress BEB receives a multicast stream on a UNI of an L2VSN enabled for PIM snooping, the ingress BEB dynamically allocates an I-SID for the multicast stream and advertises a corresponding (S, G, Service Instance) to Dynamic I-SID mapping to a rest of the SPB Network using existing ISIS TLVs.

Processing block 68 states forwarding the multicast stream through the SPB network in accordance with the multicast tree.

Processing block 70 discloses the ingress BEB checks for activity on the multicast stream and when the multicast stream has been inactive for a duration longer than an allowed aging time, the ingress BEB withdraws the advertisement for a Data I-SID that the ingress BEB allocated for the multicast stream.

Figure 7:
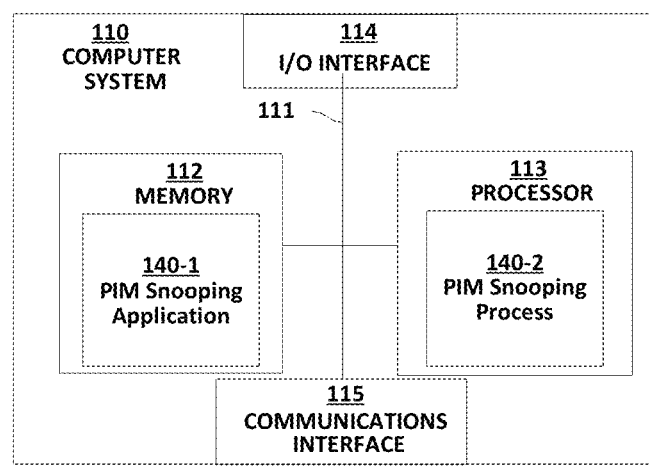
FIG. 7 computer diagram of a computerized device for PIM snooping for a SPB network in accordance with a particular embodiment of the present invention.

FIG. 7 is a block diagram illustrating example architecture of a computer system 110 that executes, runs, interprets, operates or otherwise performs a PIM snooping operating application 140-1 and PIM snooping operating process 140-2 suitable for use in explaining example configurations disclosed herein. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with a PIM snooping operating application 140-1 as explained herein. The PIM snooping operating application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of a PIM snooping operating application 140-1. Execution of a PIM snooping operating application 140-1 in this manner produces processing functionality in the PIM snooping operating process 140-2. In other words, the PIM snooping operating process 140-2 represents one or more portions or runtime instances of a PIM snooping operating application 140-1 (or the entire a PIM snooping operating application 140-1) performing or executing within or upon the processor 113 in the computerized device 110 at runtime.

It is noted that example configurations disclosed herein include the PIM snooping operating application 140-1 itself (i.e., in the form of un-executed or non-performing logic instructions and/or data). The PIM snooping operating application 140-1 may be stored on a computer readable medium (such as a floppy disk), hard disk, electronic, magnetic, optical, or other computer readable medium. A PIM snooping operating application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of a PIM snooping operating application 140-1 in the processor 113 as the PIM snooping operating process 140-2. Those skilled in the art will understand that the computer system 110 may include other processes and/or software and hardware components, such as an operating system not shown in this example.

During operation, processor 113 of computer system 100 accesses memory system 112 via the interconnect 111 in order to launch, run, execute, interpret or otherwise perform the logic instructions of the PIM snooping application 140-1. Execution of PIM snooping application 140-1 produces processing functionality in PIM snooping process 140-2. In other words, the PIM snooping process 140-2 represents one or more portions of the PIM snooping application 140-1 (or the entire application) performing within or upon the processor 113 in the computer system 100.

It should be noted that, in addition to the PIM snooping process 140-2, embodiments herein include the PIM snooping application 140-1 itself (i.e., the un-executed or non-performing logic instructions and/or data). The PIM snooping application 140-1 can be stored on a computer readable medium such as a floppy disk, hard disk, or optical medium. The PIM snooping application 140-1 can also be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of PIM snooping application 140-1 in processor 113 as the PIM snooping process 140-2. Those skilled in the art will understand that the computer system 100 can include other processes and/or software and hardware components, such as an operating system that controls allocation and use of hardware resources associated with the computer system 100.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which a Shortest Path Bridging (SPB) network having an ingress Backbone Edge Bridge (BEB), configured with a Layer 2 Virtual Services Network (L2VSN) enabled, and at least one egress BEB coupled to at least one Protocol Independent Multicast (PIM) network, the at least one egress BEB configured with the L2VSN enabled, comprising:
  snooping, by said egress BEB, PIM join and prune messages for a multicast stream in the L2VSN in said SPB network;
  building a multicast tree in said SPB network for said multicast stream in accordance with said PIM join and prune messages; and
  forwarding, by the ingress BEB, said multicast steam through the L2VSN in said SPB network in accordance with said multicast tree.

2. The method of claim 1 wherein said egress BEB includes a PIM-Snooping module and wherein said PIM join and prune messages are copied to said PIM-Snooping module in said egress BEB.

3. The method of claim 2 wherein said PIM-Snooping module maintains a list of active receiver ports for said multicast stream based on said PIM join and prune messages.

4. The method of claim 3 wherein said egress BEB that has active receiver ports for a multicast stream will join all Data I-SID trees representing the multicast stream by sending the ISIS TLVs used to join an I-SID in said SPB network.

5. The method of claim 4 wherein when an update of active receiver ports on said BEB results in a last active receiver port to be removed, said egress BEB withdraws its receive interest in the Data I-SID for said multicast tree resulting in the pruning of said multicast tree within said SPB network.

6. The method of claim 1 wherein when said ingress BEB receives the multicast stream on a UNI of the L2VSN enabled for PIM snooping, said ingress BEB dynamically allocates an I-SID for said multicast stream and advertises a corresponding (S, G, Service Instance) to Dynamic I-SID mapping to a rest of said SPB Network using existing ISIS TLVs.

7. The method of claim 6 wherein said ingress BEB checks for activity on said multicast stream and when said multicast stream has been inactive for a duration longer than an allowed aging time, said ingress BEB withdraws said advertisement for a Data I-SID that said ingress BEB allocated for said multicast stream.

8. The method of claim 1 wherein required multicast trees are built for multicast traffic for a stream to flow through the L2VSN from said ingress BEB of said SPB network to said at least one Egress BEB of said SPB network that has active receiver ports for said multicast stream.

9. A non-transitory computer readable storage medium having computer readable code thereon for Protocol Independent Multicast (PIM) snooping for a Short Path Bridge (SPB) network that includes an ingress Backbone Edge Bridge (BEB), configured with a Layer 2 Virtual Services Network (L2VSN) enabled, and at least one egress BEB coupled to at least one Protocol Independent Multicast (PIM) network, the at least one egress BEB configured with the L2VSN enabled, the medium including instructions in which a computer system performs operations comprising:
  snooping, by said egress BEB, PIM join and prune messages for a multicast stream in the L2VSN in said SPB network;
  building a multicast tree in said SPB network for said multicast stream in accordance with said PIM join and prune messages; and
  forwarding, by the ingress BED, said multicast steam through the L2VSN in said SPB network in accordance with said multicast tree.

10. The non-transitory computer readable storage medium of claim 9 wherein said egress BEB includes a PIM-Snooping module and wherein said PIM join and prune messages are copied to said PIM-Snooping module in said egress BEB.

11. The non-transitory computer readable storage medium of claim 10 wherein said PIM Snooping module maintains a list of active receiver ports for each multicast stream based on said PIM join and prune messages.

12. The non-transitory computer readable storage medium of claim 11 wherein said egress BEB that has active receiver ports for said multicast stream will join all Data I-SID trees representing the multicast stream by sending the ISIS TLVs used to join an I-SID in said SPB network.

13. The non-transitory computer readable storage medium of claim 12 wherein when an update of active receiver ports on said Egress BEB results in a last active receiver port to be removed, said egress BEB withdraws its receive interest in the Data I-SID for said multicast tree resulting in the pruning of said multicast tree within said SPB network.

14. The non-transitory computer readable storage medium of claim 9 wherein when said ingress BEB receives the multicast stream on a UNI of the L2VSN enabled for PIM snooping, said ingress BEB dynamically allocates a Data I-SID for said multicast stream and advertises a corresponding (S, G, Service Instance) to Dynamic I-SID mapping to a rest of said SPB Network using existing ISIS TLVs.

15. The non-transitory computer readable storage medium of claim 14 wherein said ingress BEB checks for activity on said multicast stream and when said multicast stream has been inactive for a duration longer than an allowed aging time, said ingress BEB withdraws said advertisement for a Data I-SID that said ingress BEB allocated for said multicast stream.

16. The non-transitory computer readable storage medium of claim 9 wherein required multicast trees are built for multicast traffic for said multicast stream to flow through the L2VSN from said ingress BEB of said SPB network to said at least one BEB of said SPB network that has active receiver ports for said multicast stream.

17. A computer system comprising:
  an ingress Backbone Edge Bridge (BEB), configured with a Layer 2 Virtual Services Network (L2VSN) enabled;
  an egress BEB bridge, configured with the Layer 2 Virtual Services Network (L2VSN) enabled;

a Shortest Path Bridge (SPB) network comprising the ingress BEB and the egress BEB, wherein the egress BEB is coupled with a Protocol Independent Multicast (PIM) network and snoops PIM join messages and PIM prune messages for a multicast stream in the L2VSN in the SPB network; and wherein the ingress BEB comprises:
- a memory;
- a processor;
- a communications interface;
- an interconnection mechanism coupling the memory, the processor and the communications interface; and
- wherein the memory is encoded with an application that when performed on the processor, causes the processor to perform the operations of:
    - building a multicast tree in said SPB network for said multicast stream in accordance with said PIM join and prune messages; and
    - forwarding said multicast stream through the L2VSN in said SPB network in accordance with said multicast tree.

18. The computer system of claim 17 wherein said egress BEB includes a PIM-Snooping module and wherein said PIM join and prune messages are copied to said PIM-Snooping module in said ingress BEB.

19. The computer system of claim 18 wherein said PIM-Snooping module maintains a list of active receiver ports for each multicast stream based on said PIM join and prune messages.

20. The computer system of claim 17 wherein said ingress BEB checks for activity on said multicast stream and when said multicast stream has been inactive for a duration longer than an allowed aging time, said ingress BEB withdraws said advertisement for a Data I-SID that said ingress BEB allocated for said multicast stream.

* * * * *